May 14, 1963 E. E. BRYANT Re. 25,384

EXHAUST MUFFLER

Original Filed July 27, 1954

INVENTOR.
Edwin E. Bryant
BY
Olson & Trexler
attys.

United States Patent Office

Re. 25,384
Reissued May 14, 1963

25,384
EXHAUST MUFFLER

Edwin E. Bryant, Stoughton, Wis., assignor to Nelson Muffler Corporation, Stoughton, Wis., a corporation of Wisconsin Original No. 2,960,179, dated Nov. 15, 1960, Ser. No. 446,033, July 27, 1954. Application for reissue Mar. 14, 1962, Ser. No. 180,939
6 Claims. (Cl. 181—57)

Matter enclosed in heavy brackets [ ] appears in the original patent but forms no part of this reissue specification; matter printed in italics indicates the additions made by reissue.

The present invention relates to novel internal combustion engine exhaust mufflers.

An object of the present invention is to provide a novel internal combustion engine exhaust muffler or silencer having an improved construction for producing more effective out of phasing of exhaust pulsations and silencing exhaust noises and for providing more efficient operation without creating objectionable back pressures.

Another object of the present invention is to provide a novel internal combustion engine or silencer which is of simple and economical construction and wherein the parts thereof may be assembled together relatively easily as compared with mufflers heretofore suggested by the prior art.

Still another object of the present invention is to provide a novel muffler or silencer of the above described type which is of strong and rigid construction to provide a long operating life.

Other objects and advantages of the present invention will appear from the following description and the accompanying drawings wherein.

Figure 1:
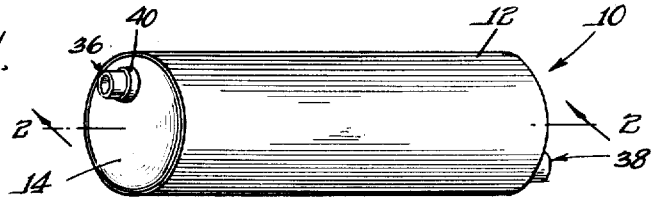
FIG. 1 is a perspective view of a muffler embodying the principles of this invention.

Referring now more specifically to the drawings wherein like parts are designated by the same numerals throughout the various figures, a muffler or silencer 10 includes an elongated tubular sheet metal body or shell 12 which is closed by oppositely disposed dish-shaped end members 14 and 16. Preferably, the end members are provided with peripheral flanges 18 and 20 which are welded to the body to provide gastight joints. The interior of the muffler shell is divided into a plurality of chambers by longitudinally spaced dish-spaced partitions. In the embodiment illustrated in the drawings, partitions 22, 24 and 26 are spaced longitudinally within the shell to divide the interior of the shell into chambers 28, 30, 32 and 34. As will be understood, the intermediate partition 24 may in some instances be eliminated while, on the other hand, in other instances it may be desirable to provide additional intermediate partitions similar to the partition 24. A tube 36 extends through the end member 14 and opens into the chamber 34 located adjacent the end member 16 and a similar tube 38 extends through the end member 16 and opens into the chamber 28. Either of these tubes may be used for an exhaust gas inlet or outlet tube depending on the requirements of the particular installation of the muffler and, for convenience, the tube 36 will be tentatively designated as the inlet tube and the tube 38 will be designated as the outlet tube.

Figure 2:
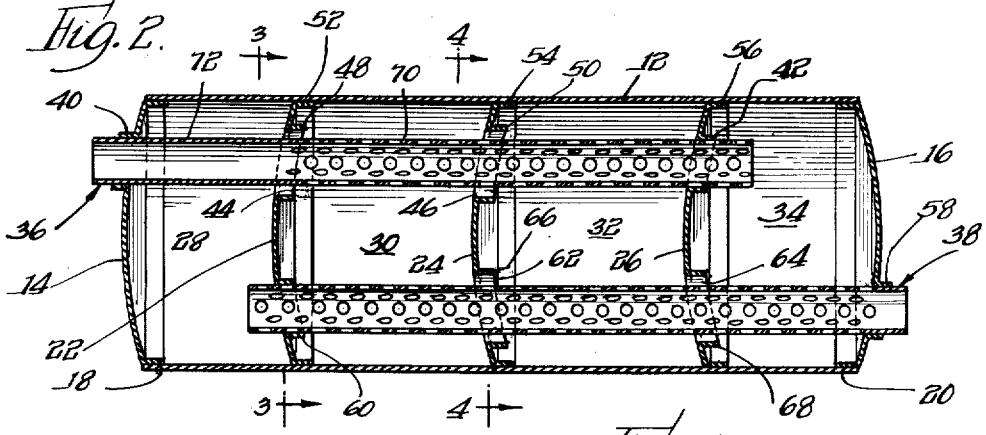
FIG. 2 is an enlarged vertical cross-sectional view taken along line 2—2 in FIG. 1.
Figure 3:
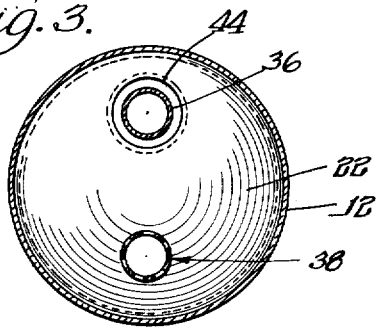
FIG. 3 is a cross-sectional view taken along line 3—3 in FIG. 2.
Figure 4:
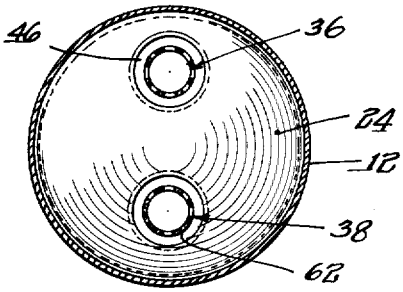
FIG. 4 is a cross-sectional view taken along line 4—4 in FIG. 2.

The partitions are provided with openings or gas passageways therethrough and, in accordance with the present invention, these openings are formed in a relatively simple and economical manner and are also formed so as to simplify the assembly of the various muffler parts. More specifically, as shown best in FIGS. 2, 3 and 4, the inlet tube 36 is supported adjacent its opposite ends by the end member 14 and the partition 26. Preferably, the end member 14 is provided with an annular flange 40 and the partition 26 is provided with a similar flange 42, which flanges encircle the tube 36. The flange 40 may be welded to the tube while the flange 42 receives the tube with a slip fit to permit relative axial expansion between the tube and the shell. The tube 36 extends through openings 44 and 46 in the partitions 22 and 24 and it is seen that these openings have a diameter substantially greater than the diameter of the tube so that they provide gas passageways. In addition, it will be appreciated that the assembly of the tube through the end member 14 and the partitions is substantially simplified since the tube is supported only at two points and it is unnecessary to arrange the openings 44 and 46 in exact axial alignment with the tube and the openings in the member 14 and partition 26 through which the tube extends. Preferably, the partitions 22 and 24 are strengthened and rigidified by respectively providing them with annular flanges 48 and 50 surrounding the openings 44 and 46. In addition, the entire structure is strengthened by providing the partitions with peripheral flanges 52, 54 and 56 which may be welded to the shell 12.

The tube 38 is supported within the shell similarly to the tube 36. Thus, the tube 38 is received in and welded to an annular flange 58 formed on the end member 16 and is received in an annular flange 60 formed on the partition 22, which last mentioned flange receives the tube with a slipfit. The partitions 24 and 26 are provided with openings 62 and 64 in general axial alignment with the tube 38 and having a diameter greater than the diameter of the tube 38 so as to provide gas passageways and to eliminate any necessity for bringing the openings 62 and 64 into exact axial alignment with the tube. Preferably, the structure is further strengthened by providing the partitions 24 and 26 with annular flanges 66 and 68 surrounding the openings 62 and 64. It should be noted that the area of the annular portion of each of the openings 44, 46, 62 and 64 surrounding their associated tubes is relatively small so that these openings further serve to effect an out of phasing of the gas impulses. However, as will be understood, these openings should be large enough so that gases may pass therethrough without unduly increasing the exhaust back pressure.

With the structure thus far described, it is seen that exhaust gases entering the inlet tube 36 will be discharged into the chamber 34 wherein they are expanded and cooled. From the chamber 34, the gases may pass through the opening 64 into the chamber 32, thence through the openings 46 and 62 into the chamber 30, and finally through the opening 44 into the chamber 28 from where they are discharged through the outlet tube 38. While the gases flowing in this manner may be expanded and cooled a certain amount and considerable out of phasing of the exhaust pulsations will be accomplished, these functions are substantially improved by another important feature of the present invention. In accordance with this feature of the invention, the inlet tube 36 is perforated along the portion 70 extending from the partition 22 to its exhaust end. These perforations permit the exhaust gases to escape from the tube 36 along numerous paths into the chambers 30, 32 and 34 so that an early expansion of the gases may be accomplished to reduce back pressure and a substantial increase in out of phasing of the exhaust impulses is effected. The particular size and spacing of the perforations in the tube portions 70 depends to a considerable extent on the particular installation of the muffler since sound frequencies to be silenced may be different in different installations and may cover substantially the entire audible range. Generally speaking, sound frequencies below 300 cycles per second may be considered to be in a low frequency range, frequencies between 300 and 1800 cycles per second provide an intermediate frequency range and frequencies above 1800 cycles per second are considered to be in a high frequency range. Low sound frequencies are usually harder to muffle and substantially the same results may be obtained for a given percent of perforated area regardless of the size and spacing of the perforations within practicable limits while for a given percent of perforated area, high frequencies are muffled better by using relatively small closely spaced perforations. In general, the perforations may be formed with diameters ranging between about one-eighth inch and one-quarter inch with the smaller sizes being preferred for higher frequencies.

For most sound frequencies, optimum results are obtained by providing the tubes 36 and 38 with perforations throughout their entire lengths within the shell. However, for certain higher frequencies the tube 36 may be provided with an imperforate tube portion 72 extending into and substantially through a chamber 28 and, more particularly, the chamber into which the open end of the outlet tube extends. By making the tube portion 72 imperforate, the by-passing of an excessive amount of exhaust gases directly to the chamber 28 is precluded, thereby improving the efficiency of the muffler for such frequencies. In the embodiment illustrated in FIGS. 1 through 4, the tube 38 is perforated throughout its entire length and these perforations permit the exhaust gases to enter the tube 38 along numerous paths from the various chambers to further effect out of phasing of the exhaust impulses and increase the muffling action.

As stated hereinabove, for some installations, the tube 38 may be used as the inlet tube while the tube 36 may be used as the outlet tube. This arrangement is particularly advantageous for muffling certain sound frequencies which are such that any tendency for the exhaust gases to pass directly from the tube 38 through the chamber 34 and out of the tube 36 is minimized. When the muffler is used in this manner, the imperforate tube portion 72 is important since at certain sound frequencies exhaust gases would pass at an undesirable rate directly from the chamber 28 into the tube 36 if the tube portion 72 were perforated.

Figure 5:
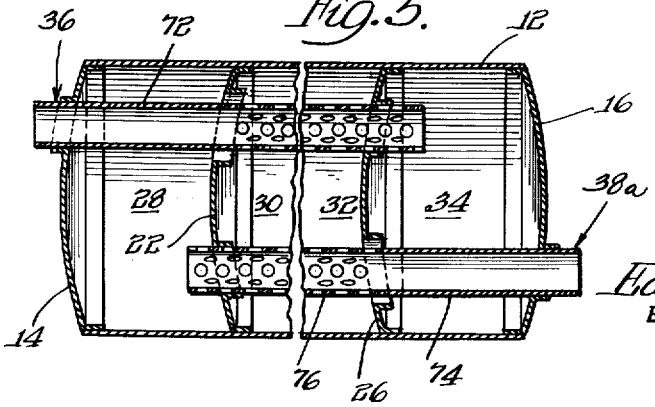
FIG. 5 is a cross-sectional view similar to FIG. 2 but showing a slightly modified form of the present invention.

FIG. 5 illustrates a slightly modified form of the invention. In this figure, the elements of the muffler, which are identical to corresponding elements of the muffler described above, are indicated by identical reference numerals. This embodiment differs from the muffler 10 in that an outlet tube 38a is provided which has an imperforate portion 74 extending substantially through the chamber 34 and a perforated portion 76 which extends through the chambers 30 and 32 and opens into the chamber 28. This form of the muffler is especially useful for muffling certain sound frequencies which would create an undesirable by-passing flow of exhaust gases from the tube portion 72 through the chamber 28 and into the tube 38a and also from the chamber 34 into the outlet tube portion 74 in the event these tube portions were perforated.

From the above description, it is seen that the present invention has provided a novel exhaust muffler structure which is capable of providing improved muffling or silencing of exhaust noises without creating undue back pressure, which muffler may be readily adapted for the most efficient muffling of various sound frequencies. In addition, it is seen that the present invention has provided the novel muffler of simple and rugged construction with the various parts formed so that they may be easily and economically assembled together.

While the preferred embodiments of the present invention have been illustrated and described herein, it is obvious that many structural details may be changed without departing from the spirit and scope of the appended claims.

The invention is claimed as follows:

1. An exhaust muffler comprising an elongated shell closed by end members at opposite inlet and outlet ends thereof, a plurality of transverse partitions spaced axially within said shell and providing with said end members inlet and outlet end chambers at opposite ends of the shell and an intermediate chamber, said partitions including a first group of axially aligned opening means adjacent one portion of the periphery of said shell, a one-piece inlet tube extending through and fixedly mounted in said inlet end member and extending through all of said opening means in each of the partitions and opening into the outlet end chamber, portions of said tube extending through the intermediate chamber being perforated, the opening means in the partition adjacent the outlet end of the shell closely receiving and supporting the tube with a slip fit permitting the tube to be slidable within the last mentioned opening means and relative to the last mentioned partition for accommodating relative expansion and contraction of the tube and shell, the remainder of said opening means being substantially larger than said tube and providing passageway means between the inlet end chamber and the intermediate chamber, said partitions including a second group of axially aligned opening means adjacent a portion of the periphery of said shell remote from the first group of opening means, a one-piece outlet tube extending through and fixedly mounted on said outlet end member and extending through all of the opening means of said second group and all of said partitions and opening into the inlet end chamber, one of the opening means of said second group in the partition adjacent said inlet end member closely receiving and supporting said outlet tube with a slip fit permitting the outlet tube to be slidable therein for accommodating relative expansion and contraction of the tube and shell, the remainder of said second group of opening means being substantially larger than said outlet tube and providing passageway means between the outlet end chamber and the intermediate chamber, portions of said outlet tube traversing the intermediate chamber being perforated, the intermediate chamber providing transverse communication between the perforated portions of the tubes passing therethrough and combining with the said first and second passageway means to promote flow of exhaust gases back and forth transversely of said shell during passage therethrough.

2. An exhaust muffler as claimed in claim 1, wherein the portion of a tube traversing one of said end chambers is perforated.

3. An exhaust muffler as claimed in claim 1, wherein the portion of a tube traversing one of said end chambers is imperforate.

*4. An exhaust muffler comprising an elongated shell closed by end members at opposite inlet and outlet ends thereof, a plurality of transverse partitions spaced axially within said shell and providing with said end members inlet and outlet end chambers adjacent opposite ends of said shell and intermediate chamber means, an inlet tube extending through and fixedly mounted in said inlet end member and extending through all of said partitions and opening into said outlet end chamber, said inlet tube being free of any direct fixed connection with all of said partitions and having an inner end portion supported with a slip fit in the opening means in a partition adjacent said outlet chamber for accommodating relative expansion between said inlet tube and said shell, an outlet tube extending through and fixedly mounted in said outlet end member and extending through all of said partitions and opening into said inlet end chamber, said outlet tube being free of any direct fixed connection with all of said partitions and having an inner end portion supported with a slip fit in opening means in a partition adjacent said inlet end chamber for accommodating relative expansion between said outlet tube and said shell, portions of both of*

*said tubes within said intermediate chamber means being perforated, a portion of said inlet tube extending through said inlet end chamber and a portion of said outlet tube extending through said outlet end chamber being substantially imperforate, said partition adjacent said inlet end chamber having an opening therein providing a gas passageway therethrough adjacent one peripheral portion of the shell, said partition adjacent said outlet end chamber having an opening therein providing a gas passageway therethrough adjacent a second peripheral portion of said shell circumferentially offset from said one peripheral portion for promoting flow of exhaust gases through and transversely of said chambers and said chamber means, the intermediate chamber means providing transverse communication between said perforated portions of the tube passing therethrough and thereby combining with said first and second mentioned passageways to promote the flow of exhaust gases back and forth transversely of the shell during passage therethrough.*

*5. An exhaust muffler comprising an elongated shell closed by end members fixed at opposite inlet and outlet ends thereof, a plurality of transverse partitions spaced axially within said shell and providing inlet and outlet end chambers adjacent opposite ends of said shell and intermediate chamber means, an inlet tube extending through and fixedly welded to said inlet end member and extending through all of said partitions and opening into said outlet end chamber, said inlet tube being free of any direct connection fixing said inlet tube with both said partitions and said shell, said inlet tube having an inner end portion supported by a partition adjacent said outlet chamber for slipping movement relative to said shell for accommodating relative expansion between said inlet tube and said shell, an outlet tube extending through and fixedly welded to said outlet end member and extending through all of said partitions and opening into said inlet end chamber, said outlet tube being free of any direct connection fixing said outlet tube with both said partitions and said shell, said outlet tube having an inner end portion supported by a partition adjacent said inlet end chamber for slipping movement relative to said shell for accommodating relative expansion between said outlet tube and said shell, portions of both of said tubes within said intermediate chamber means being perforated, said partition adjacent said inlet end chamber having an opening therein providing a gas passageway therethrough offset from said outlet tube, said partition adjacent said outlet end chamber having an opening therein providing a gas passageway therethrough offset from said inlet tube, both of said passageways providing direct communication between the chambers at opposite sides of their respective partitions, both of said passageways completely terminating and being fully opened around their entire peripheries immediately at opposite sides of their respective partitions, the intermediate chamber means providing transverse communication between said perforated portions of the tube passing therethrough and thereby combining with said first and second mentioned passageways to promote the flow of exhaust gases back and forth transversely of the shell during passage therethrough.*

*6. An exhaust muffler comprising an elongated shell closed by end members at opposite inlet and outlet ends thereof, a plurality of transverse partitions spaced axially within said shell and providing inlet and outlet end chambers adjacent opposite ends of said shell and intermediate chamber means, an inlet tube extending through and fixedly mounted in said inlet end member and extending through all of said partitions and opening into said outlet end chamber, said inlet tube having an inner end portion supported with a slip connection by a partition adjacent said outlet chamber, an outlet tube extending through and fixedly mounted in said outlet end member and extending through all of said partitions and opening into said inlet end chamber, said outlet tube having an inner end portion supported with a slip connection by a partition adjacent said inlet end chamber, portions of both of said tubes within said intermediate chamber means being perforated, a portion of said inlet tube in said inlet end chamber and a portion of said outlet tube in said outlet end chamber being imperforate, said partition adjacent said inlet end chamber having an opening therein providing a gas passageway therethrough offset from said outlet tube, said partition adjacent said outlet end chamber having an opening therein providing a gas passageway therethrough offset from said inlet tube, both of said passageways providing direct communication between the chambers at opposite sides of their respective partitions, both of said passageways completely terminating and being fully opened around their entire peripheries immediately at opposite sides of their respective partitions, the intermediate chamber means providing transverse communication between said perforated portions of the tube passing therethrough and thereby combining with said first and second mentioned passageways to promote the flow of exhaust gases back and forth transversely of the shell during passage therethrough.*

References Cited in the file of this patent or the original patent

UNITED STATES PATENTS

| | | |
|---|---|---|
| 1,931,736 | Noblitt et al. | Oct. 24, 1933 |
| 1,952,139 | Oldberg et al. | Mar. 27, 1934 |
| 2,070,543 | Cary et al. | Feb. 9, 1937 |
| 2,109,220 | Noblitt | Feb. 22, 1938 |
| 2,138,477 | Ludlow | Nov. 29, 1938 |
| 2,144,725 | Manning | Jan. 24, 1939 |
| 2,235,705 | Haas et al. | Mar. 18, 1941 |
| 2,337,299 | Noblitt | Dec. 21, 1943 |
| 2,520,756 | Bryant | Aug. 29, 1950 |
| 2,580,564 | Ludlow | Jan. 1, 1952 |
| 2,655,220 | Tyskewicz | Oct. 13, 1953 |
| 2,661,073 | Deremer | Dec. 1, 1953 |